US008131997B2

(12) United States Patent
Chang et al.

(10) Patent No.: US 8,131,997 B2
(45) Date of Patent: Mar. 6, 2012

(54) METHOD OF MUTUALLY AUTHENTICATING BETWEEN SOFTWARE MOBILITY DEVICE AND LOCAL HOST AND A METHOD OF FORMING INPUT/OUTPUT (I/O) CHANNEL

(75) Inventors: Kyung-ah Chang, Seoul (KR); Sang-bum Suh, Seoul (KR); Sung-kwan Heo, Seoul (KR); Byung-woan Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 959 days.

(21) Appl. No.: 12/104,508

(22) Filed: Apr. 17, 2008

(65) Prior Publication Data

US 2009/0055918 A1    Feb. 26, 2009

Related U.S. Application Data

(60) Provisional application No. 60/957,538, filed on Aug. 23, 2007.

(30) Foreign Application Priority Data

Jan. 9, 2008    (KR) .................. 10-2008-0002648

(51) Int. Cl.
*H04L 9/00*    (2006.01)
*H04L 9/32*    (2006.01)
*G06F 7/04*    (2006.01)

(52) U.S. Cl. ........ 713/159; 713/156; 713/157; 713/158; 726/9; 726/10; 726/27; 726/28; 726/29

(58) Field of Classification Search ................... 713/159
See application file for complete search history.

(56) References Cited

U.S. PATENT DOCUMENTS

2002/0026576 A1* 2/2002 Das-Purkayastha et al. . 713/156
2004/0204073 A1* 10/2004 Yanosy ......................... 455/557
2009/0044260 A1* 2/2009 Niglio et al. ...................... 726/9

OTHER PUBLICATIONS

"ISO/IEC 9798-3" —RFC 3163.*

* cited by examiner

*Primary Examiner* — Longbit Chai
(74) *Attorney, Agent, or Firm* — NSIP Law

(57) ABSTRACT

A method of mutually authenticating between a local host and a software mobility device including an operating system virtualization layer, and a method of forming an input/output (I/O ) channel. The method of authenticating a local host in the software mobility device includes requesting a certificate from the local host in which an integrity value of the local host is stored, and receiving the certificate from the local host; receiving an integrity value measured in the local host and comparing the measured integrity value with the integrity value included in the certificate to verify the local host; and when the local host is verified, encrypting a security profile of the software mobility device and transmitting the encrypted security profile to the local host so as to provide secure communication between the local host and the software mobility device.

18 Claims, 10 Drawing Sheets

METHOD OF MUTUALLY AUTHENTICATING BETWEEN SOFTWARE MOBILITY DEVICE AND LOCAL HOST AND A METHOD OF FORMING INPUT/OUTPUT (I/O) CHANNEL

CROSS-REFERENCE TO RELATED APPLICATIONS

This application claims the benefit of Korean Patent Application No. 2008-2648, filed in the Korean Intellectual Property Office on Jan. 9, 2008, and the benefit of U.S. Patent Application No. 60/957,538, filed in U.S. Patent and Trademark Office on Aug. 23, 2007, the disclosures of which are incorporated herein by reference.

BACKGROUND OF THE INVENTION

1. Field of the Invention

Aspects of the present invention relate to a method of mutually authenticating between a software mobility device and a local host and a method of forming an input/output (I/O) channel.

2. Description of the Related Art

Software mobility is a technology that stores software and data in a mobile storage medium, such as a USB Flash Drive or a storage medium contained within a mobile device (for example, a mobile phone or personal entertainment device) or downloads a client through a network connection, thereby enabling seamless computing in other personal computers (PCs) or Consumer Electronics (CE) devices. Such technology is an example of a new computing paradigm that can replace devices such as laptops. The technology is developing as a way of simply storing data through the mobile storage medium or a network connection to a moving personal computing environment. Various advanced companies, such as Microsoft, EMC, IBM, SanDisk, and RingCube, are in the process of developing solutions of the same kinds, such as Virtual PC, VMWare, SoulPad, U3, and MojoPac, based on current hardware or a virtualization technology of an operating system.

However, in supporting seamless computing in other PCs or CE devices, users' software and data and stability of personal computing environment are not considered in most cases according to infection to a local host by a malicious code (malware), such as Trojan Horses, Worms, and Viruses in PCs or CE devices, so that supporting various services such as DRM and e-Trading is limited.

Virtualization can generally be defined as a technology serviced to a high level as if various "real single computing devices" exist, instead of directly correcting the real single computing devices in which arbitrary software is executed. FIG. 1 shows a concept of virtualization. Referring to FIG. 1A, a general computing system includes a real computing machine 100 and software 110. When a concept of virtualization is introduced to the general computing system of FIG. 1A, a virtualization layer 120 is interposed between the real computing machine 100 and the software 110, as shown in FIG. 1B.

Virtualization can be classified into system virtualization and operating system (OS) virtualization according to the subject of virtualization. The system virtualization is for a physical hardware platform and provides a separate system for various operating systems. The OS virtualization virtualizes an operating system of a local host so as to provide a separate operating system for arbitrary applications.

FIG. 2 shows virtualization types according to subjects for virtualization. The OS virtualization 210 indicates that a virtualization layer 240 is interposed between an operating system 250 and an application 230. System virtualization 220 indicates that a virtualization layer 260 is interposed between a hardware platform 270 and the operating system 250.

Software mobility solutions based on such virtualization technologies can be mainly represented by adjusting an application so as to be executed by a specific API owned by each company (for example, U3 manufactured by SanDisk) or joint moving of a specific operating system (for example, VMWare manufactured by EMC) based on a system virtualization technology, in order to perform seamless computing for users' software and data after moving to other PCs or CE device via a mobile storage medium or a network connection.

However, in such conventional cases, only applications having open source code can be adjusted, so that an application range for moving software is hardly expanded. Research and development for improving a system overhead due to joint moving of the specific operating system are in progress. The software mobility solutions which move through current mobile storage media or network connections are applied to improve use of various software or applications such as DRM (Digital Rights Management) and e-Trading in moving not only simple data, but also a personal computing environment. Accordingly, supporting stability for executing environment on the related software mobility solution is continuously required.

Technology based on a conventional network connection is a streaming type from a server to a client and are mostly a server authentication through a user account and a password, instead of stability relating to execution of the software mobility solutions on the moved local host. Technology based on mobile storage media provides limited stability by supporting user authentication and encryption for data access control according to a threat to lose the storage medium.

However, while executing software such as DRM and e-Trading through the software solutions, integrity based mutual authentication for providing a safe execution environment without malware such in the local host cannot be provided by using only the security functions in the conventional technologies. Providing secure channels to prevent leakage of malicious information and forgery is limited. For example, while executing DRM content on the software mobility solutions using resources of a local host (for example, sound and video), multimedia content decoded by a stealth attack due to malware on the local host may be easily obtained. Moreover, while executing web based e-trading service on the software mobility solutions, information on user account, password, and transaction details on internet can be obtained due to an attack by malware on the local host and relating service sites may be forged.

SUMMARY OF THE INVENTION

Aspects of the present invention provide an integrity based mutual authentication between a software mobility device and a local host, the software mobility device being movable through a mobile storage medium or a network connection to secure safety of a computing execution environment in the software mobility device, an authentication method for providing a safety channel between an application on the software mobility device and an I/O device of the local host, a method of forming an I/O channel, and the software mobility device, based on an operating system virtualization technology driven based on a user mode.

According to an aspect of the present invention, there is provided a method of authenticating a local host in the software mobility device including an operating system virtualization layer, the method including: requesting the local host a certificate in which an integrity value of the local host is stored and receiving the certificate from the local host; receiving an integrity value measured in the local host and comparing the measured integrity value with the integrity value included in the certificate to verify the local host; and when the local host is verified, encrypting a security profile of the software mobility device and transmitting the encrypted security profile to the local host.

The software mobility device may be contained in a mobility storage medium.

The software mobility device may be included in a server computer connected to the local host by a network and an operating system virtualization client is downloaded to the local host from the server computer for mediating communication between the operating system virtualization layer and the local host included in the server computer.

According to another aspect of the present invention, there is provided a method of forming a safety I/O channel between a software mobility device including an operating system virtualization layer and a local host, the method including: identifying whether an application is a subject of application for security policy which requires safety I/O while driving the application in the software mobility device; as the result of identification, if the application is the subject of application for security policy, installing a security filter driver to a kernel mode on the local host; forming a safety channel through a session key while transmitting data for executing an I/O device according to driving the application included in the software mobility device by the software mobility device and the security filter driver so as to transmit data.

The session key may be generated through mutual authentication between the software mobility device and the security filter driver while installing the security filter driver of the software mobility device is owned in common between the software mobility device and the security filter driver before installing the security filter driver of the software mobility device so as to be included in the security filter driver.

According to another aspect of the present invention, there is provided software mobility device including an operating system virtualization layer, the device including: a security management unit which requests the local host a certificate in which an integrity value of the local host is stored and receives the certificate from the local host, receives an integrity value measured in the local host, compares the measured integrity value with the integrity value included in the certificate to verify the local host, and encrypts a security profile of the software mobility device, when the local host is verified, and transmits the encrypted security profile to the local host.

According to another aspect of the present invention, there is provided software mobility device including an operating system virtualization layer, the device including: a security management unit which identifies whether an application is a subject of application for security policy that requires safety I/O while driving the application in the software mobility device, installs a security filter driver to a kernel mode on the local host, if the application is the subject of application for security policy, as the result of identification, and forms a safety channel through a session key while transmitting data for executing an I/O device according to driving the application included in the software mobility device by the software mobility device and the security filter driver so as to transmit data.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
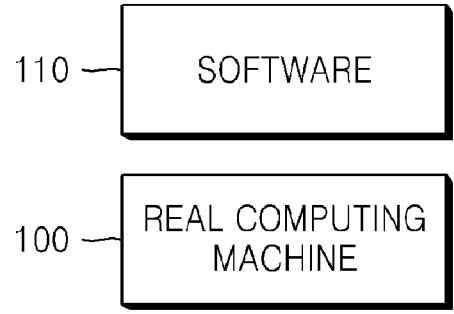
FIG. 1 is a reference diagram explaining a concept of virtualization, in general.
Figure 1B:
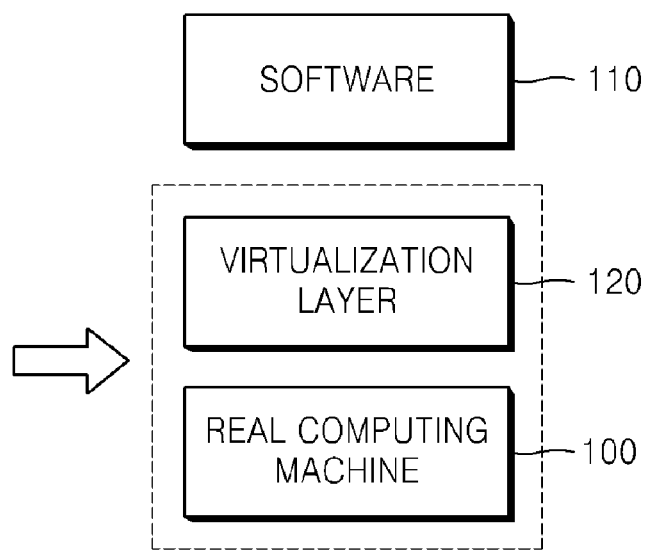
Figure 2:
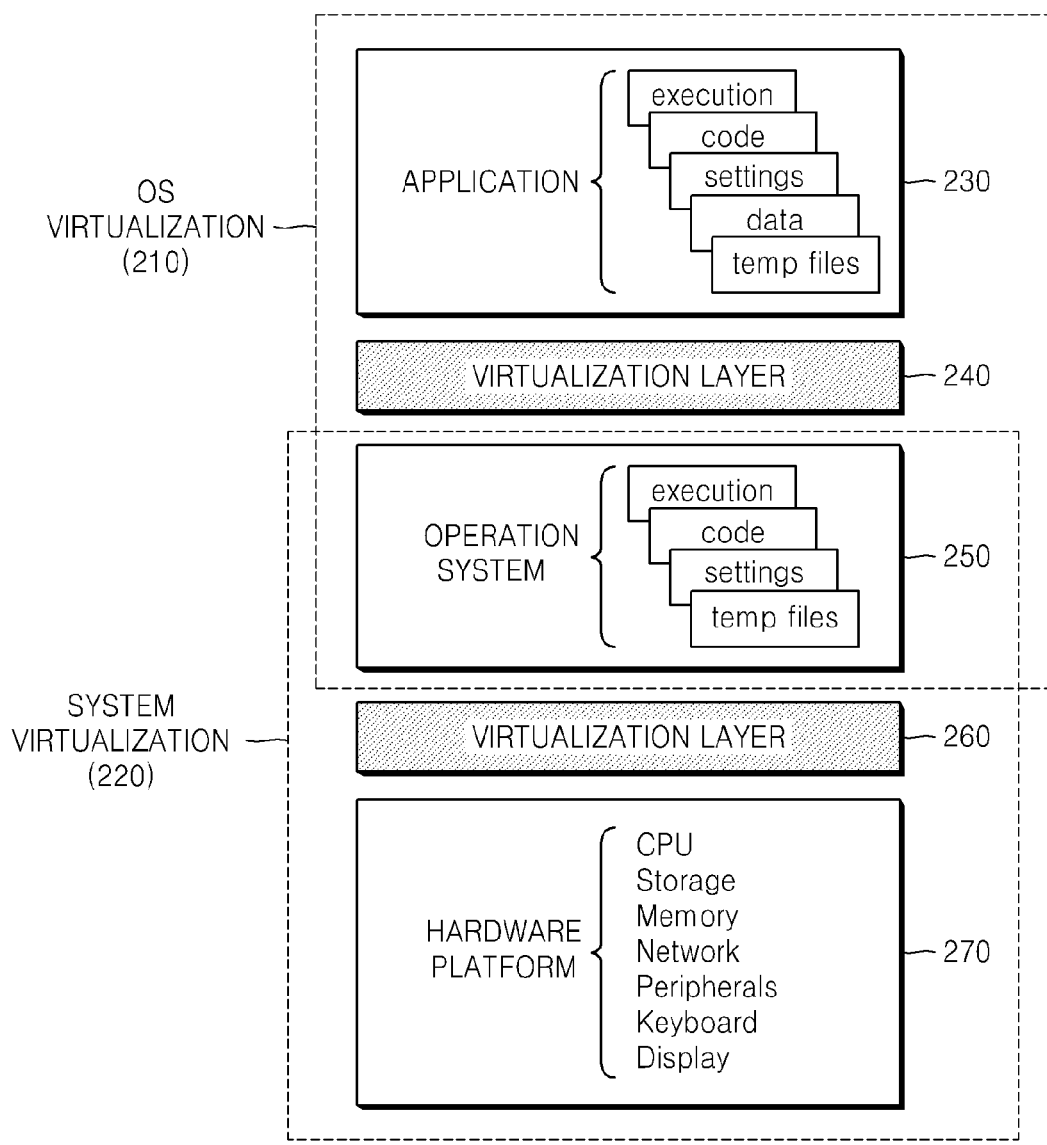
FIG. 2 is a reference diagram explaining virtualization types according to subjects for virtualization.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
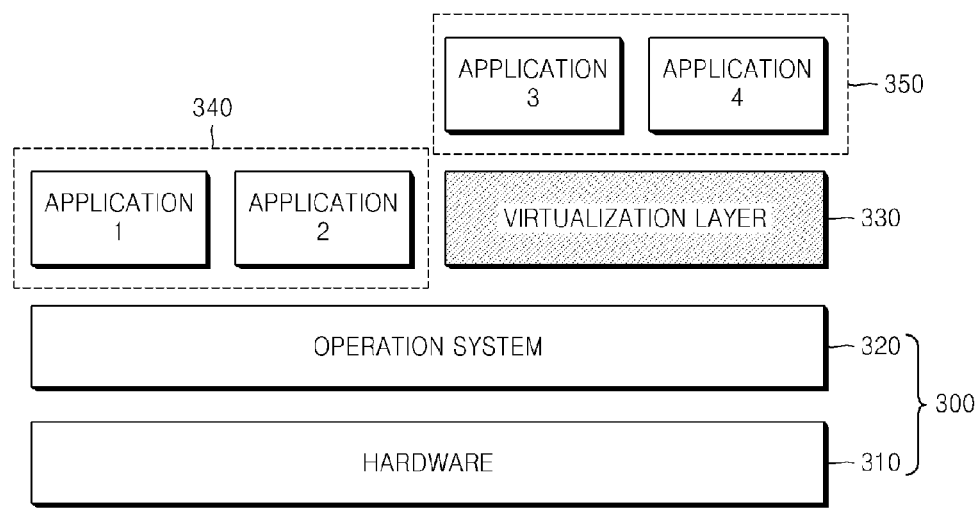
FIG. 3 is a diagram of a virtualization system according to an embodiment of the present invention.

FIG. 3 shows a virtualization system according to an embodiment of the present invention. A whole system in which a software mobility device 400 according to an embodiment of the present invention is realized is shown in FIG. 3. The software mobility device 400 is executed in a same form with a general application without additional modification to an operating system (OS) on a local host 300, based on an OS virtualization technology formed based on a user mode.

An OS virtualization layer 330 is arranged on hardware 310 and an OS 320. The OS virtualization layer 330 includes applications 1 and 2 340 executed on the OS 320 and applications 3 and 4 350 executed on the OS virtualization layer 330. The software mobility device 400 is realized in the OS virtualization layer 330. In addition, the hardware 310 and the OS 320 are collectively referred to as the local host 300.

Figure 4:
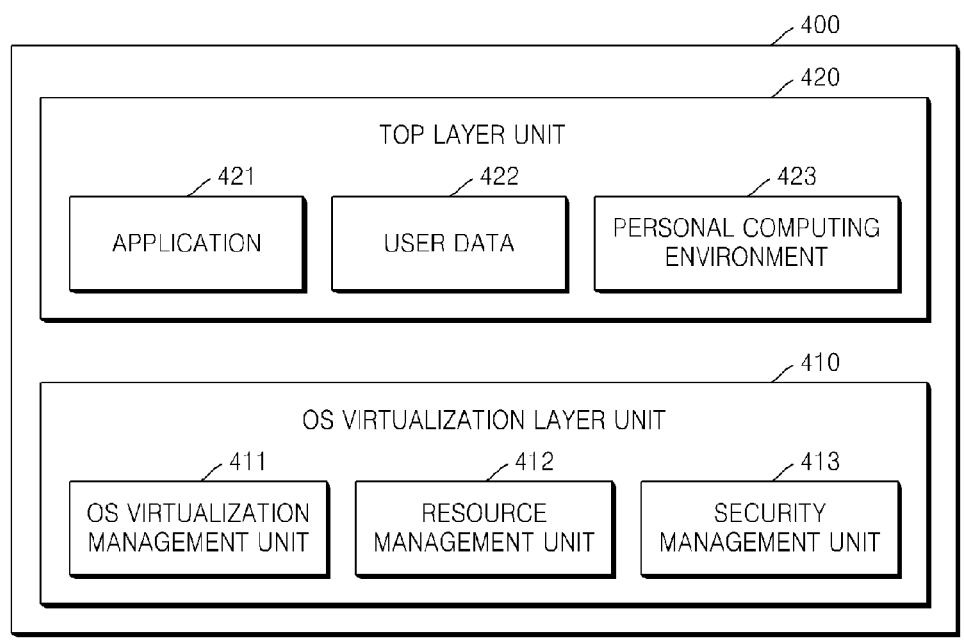
FIG. 4 is a schematic diagram of a software mobility device of FIG. 3.

FIG. 4 shows the software mobility device 400. The software mobility device 400 includes an OS virtualization layer unit 410 and a top layer unit 420. According to other aspects of the present invention, the software mobility device 400 may include additional and/or different units. Similarly, the functionality of two or more of the above units may be integrated into a single component.

The OS virtualization layer unit 410 includes an OS virtualization management unit 411, a resource management unit 412, and a security management unit 413. The OS virtualization management unit 411 manages operating system virtualization of a local host. The resource management unit 412 manages resources of the local host, and the security management unit 413 manages security with the local host.

The top layer unit 420 includes an application 421, user data 422, and a personal computing environment 423. Software or applications on the software mobility device is driven in the same way as a general application by installing onto the operating system virtualization layer.

Figure 5:
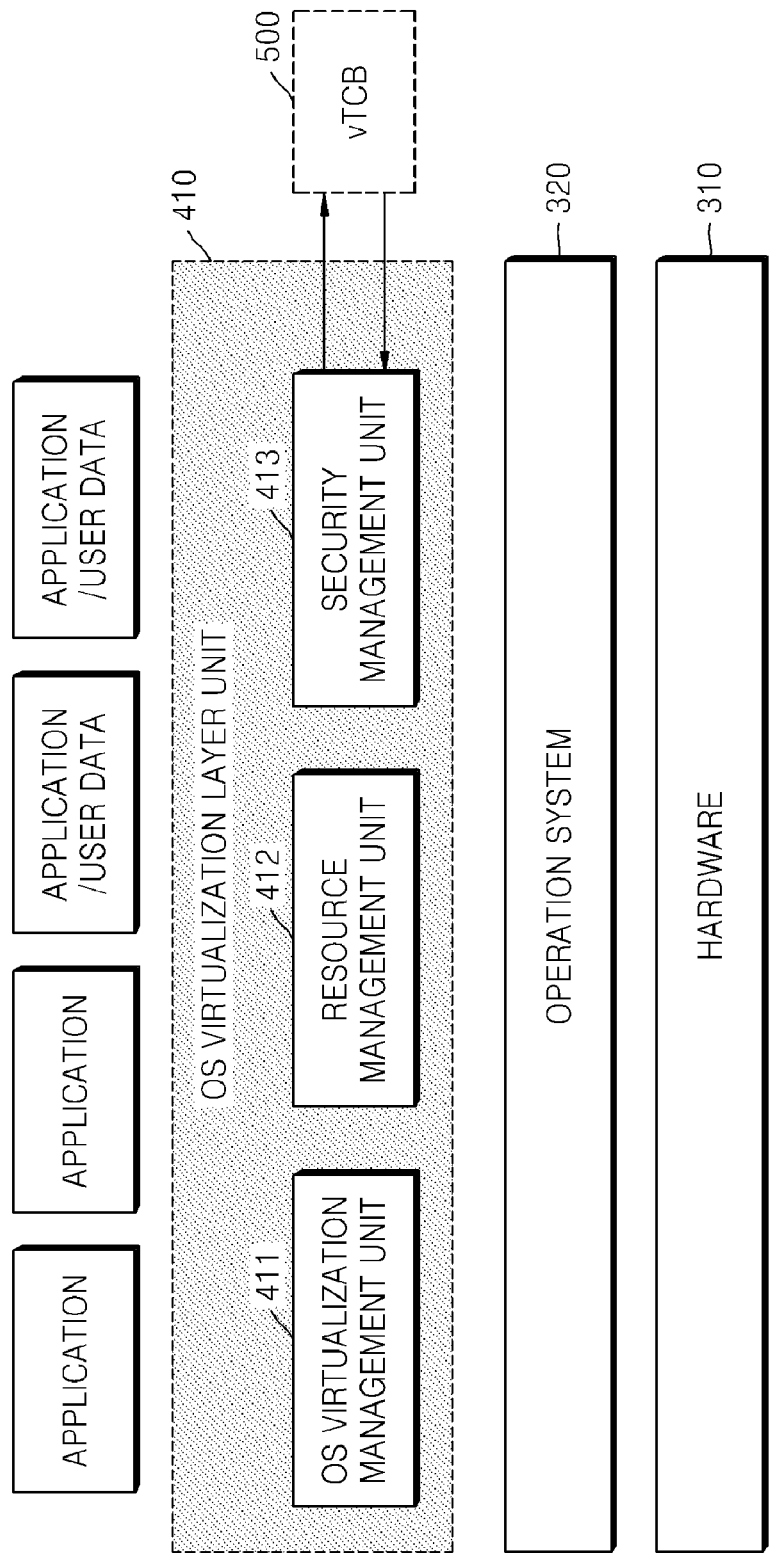
FIG. 5 is a diagram of a virtualization system including a software mobility device of FIG. 4.

FIG. 5 shows a system including the software mobility device 400. The security management unit 413, which executes mutual authentication between the software mobility device and the local host, uses a virtualized Trusted Computing Base (vTCB) 500. The TCB 1140 (shown in FIG. 11) in the local host 300 stores registration information and an encryption key of the software mobility device. The vTCB 500 can be formed in various forms such as hardware of a physical chip set or software. In addition, the local host may also have spaces for storing various registration information and encryption keys, such as for an OS and a device. A mutual authentication channel and a secure channel are formed between the software mobility device and the local host.

Figure 6:
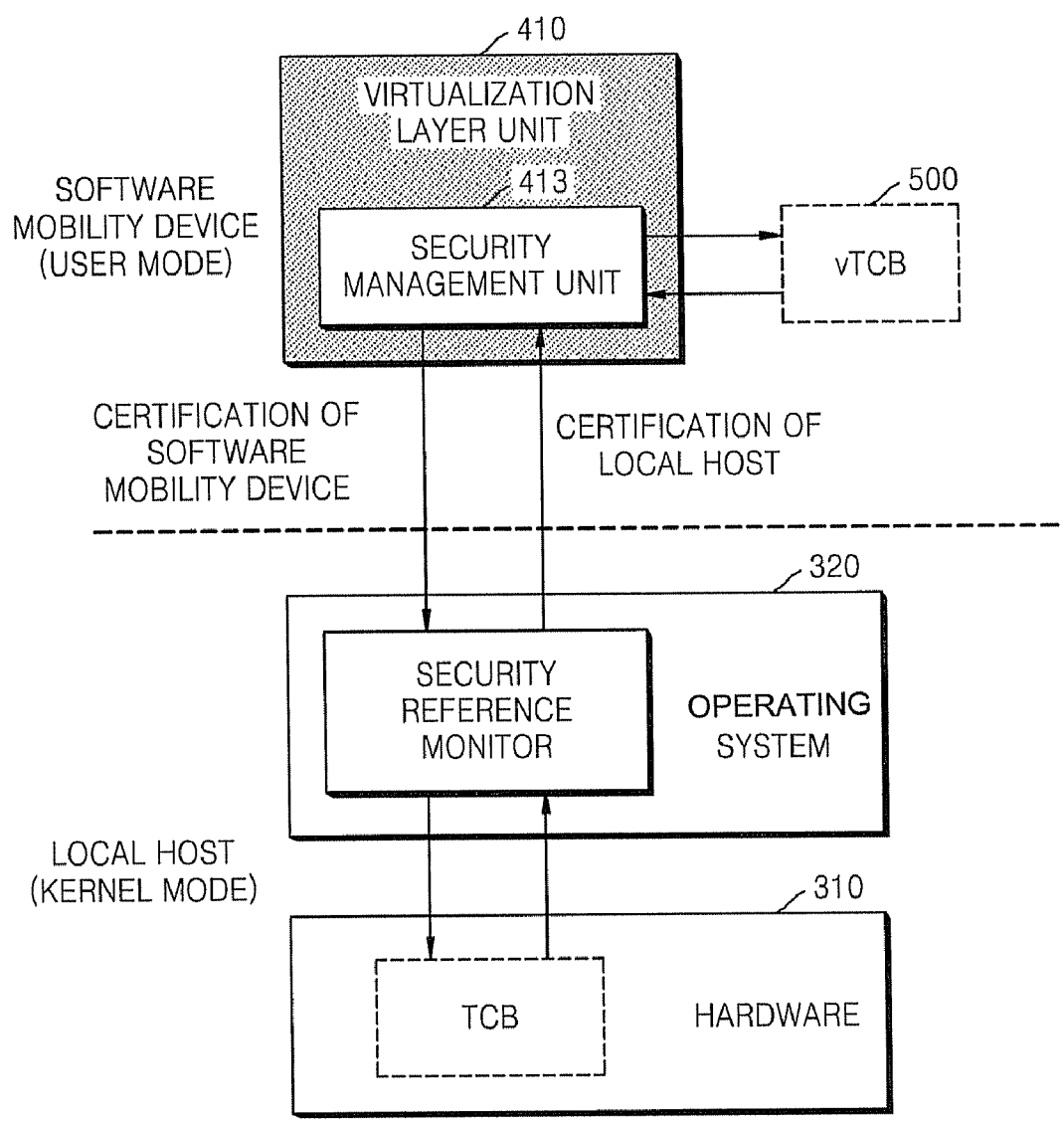
FIG. 6 is a reference diagram explaining mutual authentication between a software mobility device and a local host, according to an embodiment of the present invention.

FIG. 6 shows mutual authentication between the software mobility device 400 and the local host 300, according to an embodiment of the present invention. The software mobility device 400 allows performing mutual authentication through integrity verification using information stored in the vTCB 500 and the TCB 1140 without additional installation on the local host kernel, while initializing service through a mobile storage medium or network, so that reliability of an execution environment for the software mobility device is secured. The software mobility device 400 may be contained in a mobile storage medium or realized by a client server. The mobile storage medium may be a USB flash drive, other portable storage medium, or incorporated as part of a mobile device, such as a mobile phone or personal entertainment device.

Figure 7:
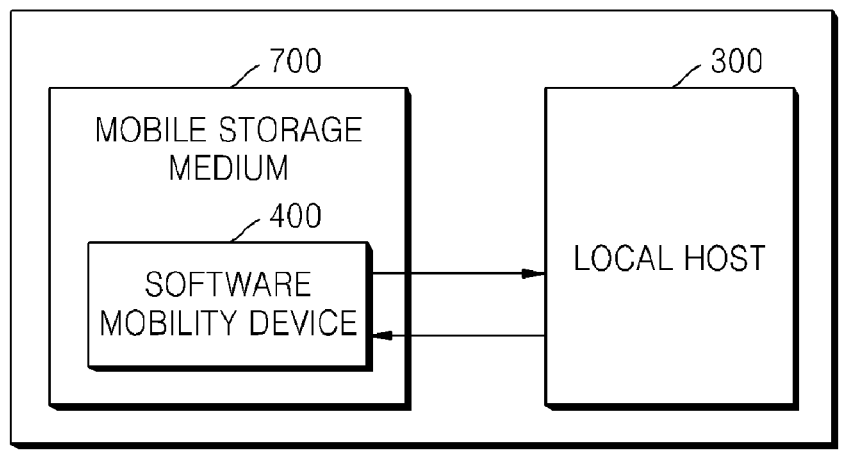
FIG. 7 illustrates an example in which a software mobility device is contained in a mobile storage medium, according to an embodiment of the present invention.

FIG. 7 shows an example in which the software mobility device 400 is contained in a mobile storage medium. The software mobility device 400 is contained in the mobile storage medium 700. The mobile storage medium 700 is inserted into a local host device 300, or is loaded to be used.

Figure 8:
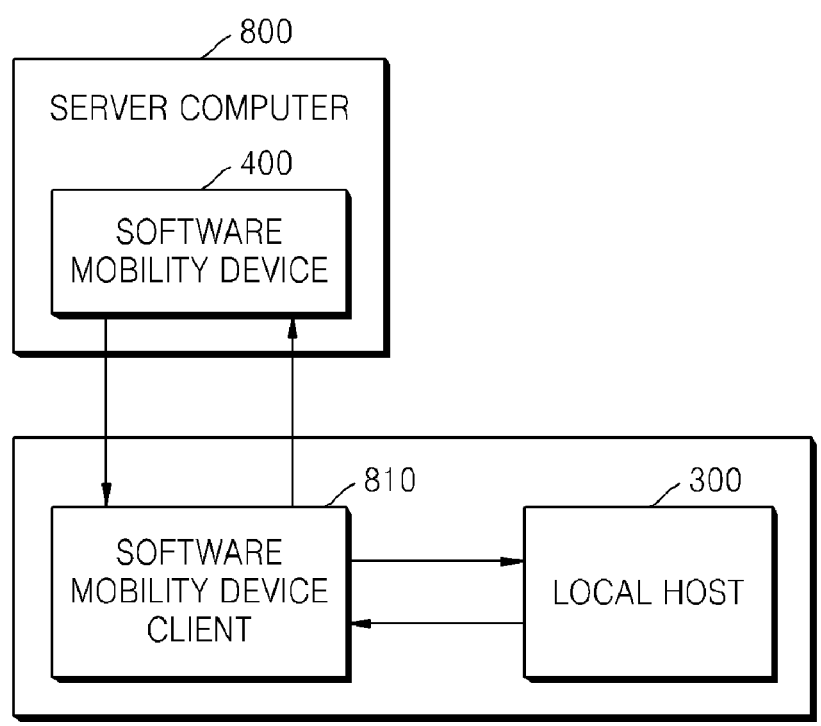
FIG. 8 illustrates an example in which a software mobility device is realized by a client server, according to an embodiment of the present invention.

FIG. 8 shows an example in which the software mobility device 400 is realized by the client server. The software mobility device 400 is arranged in a server 800. A software mobility device client 810 is downloaded from the server 800 to the local host device 300 in order for a user to use the software mobility device client 810 in the local host device 300. The downloaded software mobility device client 810 mediates between the local host device 300 and the software mobility device 400 included in the server computer 800.

Figure 9:
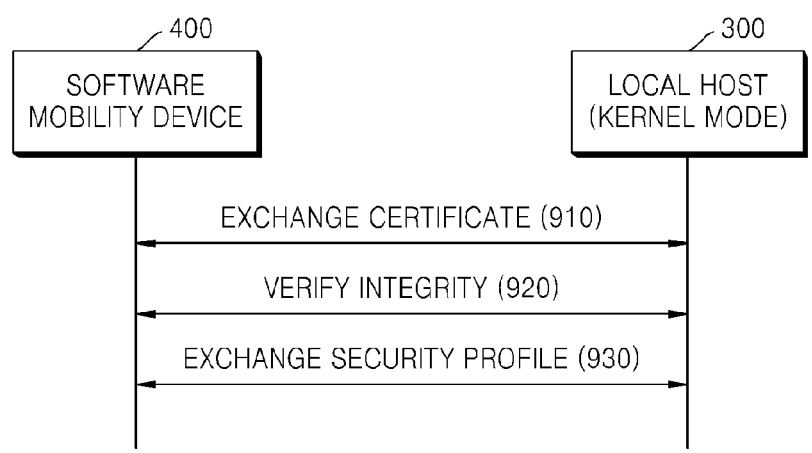
FIG. 9 is a flowchart explaining mutual authentication between a software mobility device and a local host, according to an embodiment of the present invention.

Mutual authentication between the software mobility device 400 stored in the mobile storage medium 700 and the local host 300 is described with reference to FIGS. 6 and 9. The software mobility device 400 realized by the client server will be described separately. Referring to FIGS. 6 and 9, certificates are exchanged between the software mobility device 400 and the local host 300 in operation 910. The software mobility device 400 request a certificate of the local host 300 using registration information (ID) of the software mobility device 400. The certificate is mutually exchanged with the local host 300. In other words, the software mobility device 400 requests the certificate of the local host 300 to the local host 300 and receives the certificate from the local host 300. The local host 300 requests the certificate of the software mobility device 400 and receives the certificate from the software mobility device 400.

Figure 10:
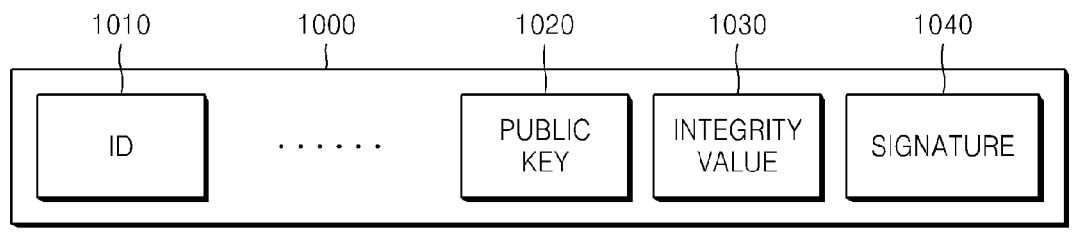
FIG. 10 is an example of a certificate used in mutual authentication of FIG. 9.

FIG. 10 shows an example of a certificate used in mutual authentication of FIG. 9. The certificate 1000 includes an ID 1010, a public key 1020, an integrity value 1030, and a signature 1040. The exchanged certificate includes the integrity value, the ID and the public key of the corresponding software mobility device and a platform and is electrically signed by a secret key of a Certificate Authority (CA). The integrity value included in the certificate may be stored as a digital file form in the vTCB 500 and the TCB 1140 so as to replace the certificate.

Returning to FIG. 9, the software mobility device 400 and the local host 300 respectively measures and exchange their own integrity values. The software mobility device 400 and the local host 300 respectively compare the received measured integrity values with the integrity value stored in the received certificate to verify the local host in operation 920. The integrity values may be measured using an integrity check module included in the vTCB 500 and the TCB 1140.

When the integrity of other party is identified through verification, each subject, that is, the mobile software mobility device 400 and the local host 300, encrypt a security profile (for example, version information) with a session key and mutually exchange the encrypted security profile. Integrity in the local host can be identified by a security reference monitor included in the OS 302 shown in FIG. 6. The security reference monitor examines whether a user has a right to access a specific object or can perform a specific act to the corresponding object, makes an inspection for security policy and user authentication, examines the user account when the user accesses a file or directory to determine permission to access, and generates the result of the examination as an examination message, if necessary.

The software mobility device 400 realized based on a network is now described. The software mobility device client 810 downloaded to the local host 300 requests registration information of the corresponding local host 300 and transmits the information to the server computer 800 in which the software mobility device 400 is located. The software mobility device client 810 communicates with the local host 300. Substantial mutual authentication is accomplished between the server computer 800 and the local host 300.

The server computer 800 requests a certificate from the local host 300 through the software mobility device client 810 and receives the certificate from the local host 300. The local host 300 requests a certificate from the server computer 800 through the software mobility device client 810 and receives the certificate from the server computer 800.

The integrity values are stored in the exchanged certificate and the certificate may be electrically signed by a secret key of a CA. In addition, the integrity values included in the corresponding certificate may be stored in the vTCB 500 and the TCB 1140 in a digital file form so as to replace the certificate.

The server computer 800 compares the received integrity measured value of the local host with the stored values included in the transmitted certificate to verify the local host. The integrity values may be measured using an integrity check module included in the vTCB 500 and the TCB 1140. The software mobility device server executes as the software mobility device client 810 on the local host. When the integrity values of other party is identified through verification, a security profile of each subject is encrypted with a session key and is exchanged.

Figure 11:
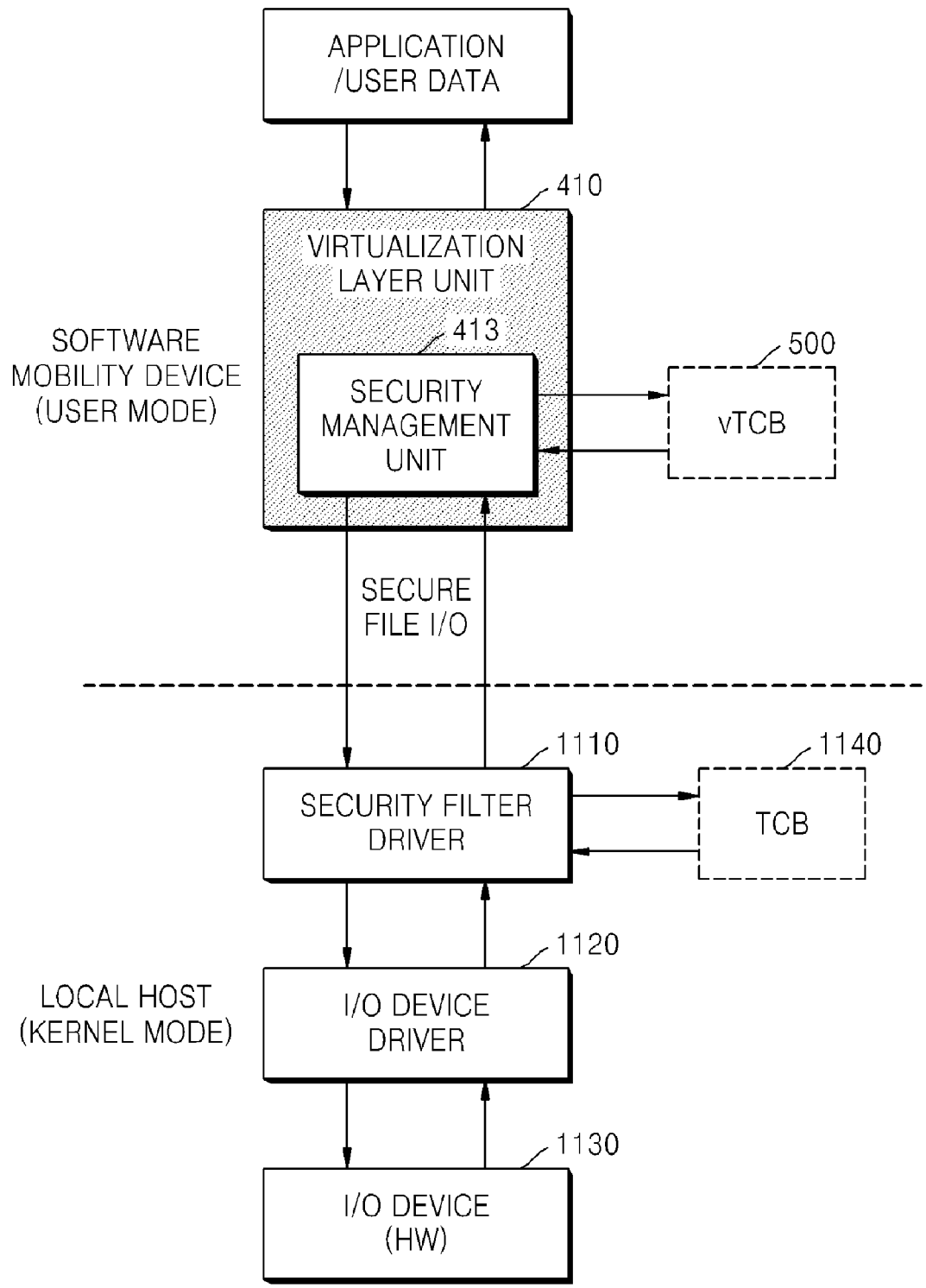
FIG. 11 is a reference diagram explaining a process of forming a safety input/output (I/O) channel between a software mobility device and a local host, according to an embodiment of the present invention.

FIG. 11 shows a process of forming a safety input/output (I/O) channel between the software mobility device 400 and the local host 300. In an application that requires security on the software mobility device 400, such as DRM (Digital Rights Management) or e-Trading, a security filter driver 1110 is executed on the local host kernel so as to verify a signature of an I/O device driver 1120. Encrypted data with respect to the corresponding session is transmitted so as to form a secure channel.

Figure 12:
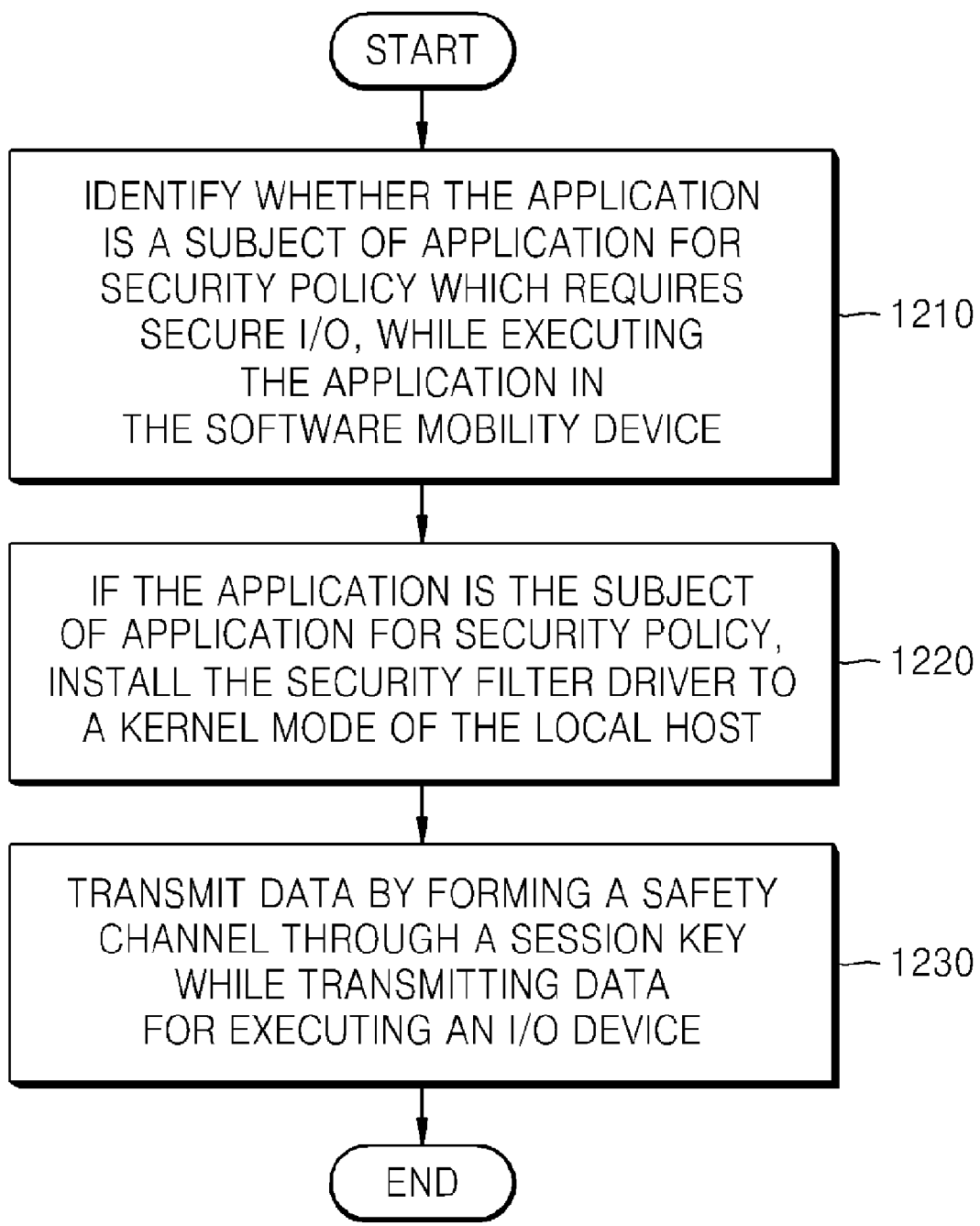
FIG. 12 is a flowchart explaining a process of forming a safety I/O channel between a software mobility device and a local host, according to an embodiment of the present invention.

FIG. 12 is a flowchart of a process of forming a secure I/O channel between the software mobility device 400 and the local host 300. Forming a secure I/O channel between the software mobility device and the moved local host is described with reference to FIGS. 11 and 12. Whether the application is a subject of application for security policy which requires secure I/O is identified while executing the application in the software mobility device 400 in operation 1210.

As the result of identification, if the application is the subject of a security policy, the security filter driver 1110 is installed to a kernel mode of the local host 300 on request of a secure file I/O in operation 1220. The security filter driver 1110 verifies a signature of a service provider (for example, Windows Hardware Qualification Lab (WHQL)) with respect to the corresponding I/O device driver 1120, thereby identifying the reliability of the I/O device driver 1120.

The software mobility device 400 and the security filter driver 1110 then form a secure channel through a session key K while transmitting data for executing an I/O device according to execution of the application in the software mobility device 400. The security filter driver 1110 transmits the corresponding data to an I/O device 1130 in operation 1230. The corresponding session key is generated during mutual authentication between the software mobility device 400 and the security filter driver while installing the security filter driver of the software mobility device 400, or is owned in common between the software mobility device 400 and the security filter driver before installing the security filter driver of the software mobility device 400 so as to be included in the security filter driver 1110.

Moreover, each time secure file I/O is requested, validity of the session key is managed with a time stamp. The session key is removed with the security filter driver when the software mobility device is completed. For example, the session keys of the software mobility device 400 and the security filter driver may be generated using random numbers and the time stamp.

Figure 13:
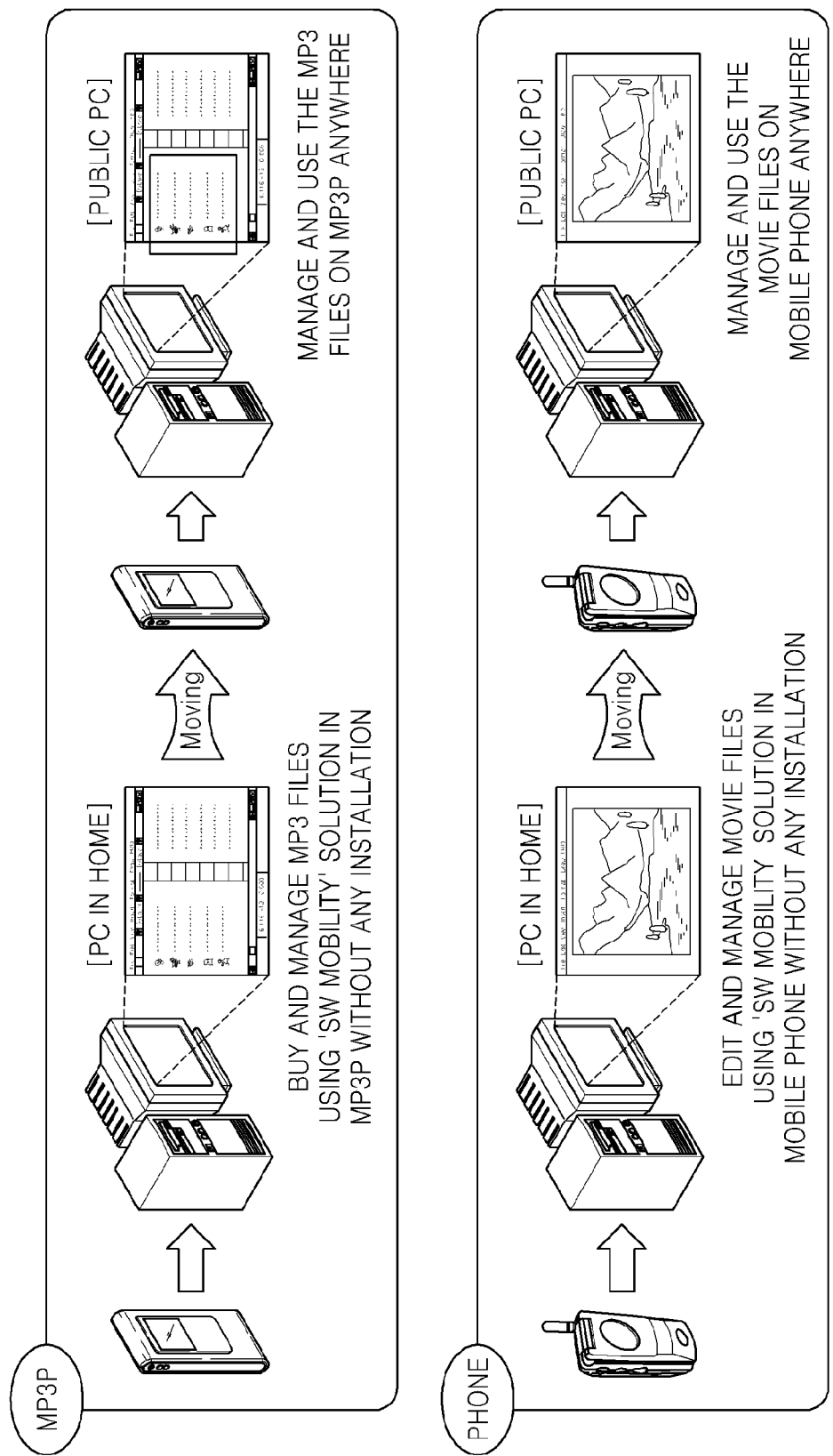
FIG. 13 is a reference diagram explaining examples of using of a mobile software mobility according to an embodiment of the present invention.

FIG. 13 shows various examples of using the mobile software mobility device 400. The software mobility device 400 can be installed not only on a general mobile storage medium such as a USB flash drive, but also on MP3 players and mobile phones having an internal memory, before introducing software for managing the corresponding device so that the software mobility device can be applied in a desired form without separate re-installation. Moreover, a safety execution environment on mobile software may be applied to a business model such as Software as a Service (SaaS) or DRM and thus can contribute to legal activation.

According to the software mobility device according to aspects of the present invention, in moving software, data, and a personal computing environment through a mobile storage medium or a network connection, without separate installation, based on the local host kernel mode and a separate operating system virtualization technology, a secure channel is provided for integrity based mutual authentication between the software mobility device and the local host and for preventing leakage of malicious information and forgery, in order to execute software such as DRM and e-Trading without regard to malware in the local host, so that seamless computing is activated in other PCs or CE devices.

Aspects of the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, DVDs, Blu-ray discs, magnetic tapes, floppy disks, and optical data storage devices. Aspects of the present invention may also be embodied carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of authenticating a local host in a software mobility device having an operating system virtualization layer, the method comprising:
   requesting a certificate from the local host in which an integrity value of the local host is stored, and receiving the certificate from the local host;
   receiving an integrity value measured in the local host, and comparing the measured integrity value with the integrity value included in the certificate so as to verify the local host through mutual authentication; and
   when the local host is verified, encrypting a security profile of the software mobility device and transmitting the encrypted security profile to the local host so as to provide secure communication between the local host and the software mobility device.

2. The method of claim 1, wherein the software mobility device is contained in a mobile storage medium.

3. The method of claim 1, wherein:
   the software mobility device is included in a server connected to the local host by a network; and
   an operating system virtualization client is downloaded to the local host from the server computer to mediate communication between the operating system virtualization layer and the local host included in the server computer.

4. A method of forming a secure I/O channel between a local host and a software mobility device comprising an operating system virtualization layer, the method comprising:

identifying whether an application is a subject of an application for security policy that requires secure I/O, while executing the application in the software mobility device;

as the result of identification, if the application is the subject of an application for security policy, installing a security filter driver to a kernel mode on the local host;

forming a secure channel through a session key while transmitting data to execute an I/O device according to execution of the application included in the software mobility device by the software mobility device and the security filter driver so as to transmit data.

5. The method of claim 4, wherein:
the session key is generated through mutual authentication between the software mobility device and the security filter driver while installing the security filter driver of the software mobility device; or
the session key is owned in common between the software mobility device and the security filter driver before installing the security filter driver of the software mobility device.

6. A software mobility device comprising an operating system virtualization layer, the device comprising:
a security management unit to request a certificate from the local host in which an integrity value of the local host is stored, to receive the certificate from the local host, to receive an integrity value measured in the local host, to compare the measured integrity value with the integrity value included in the certificate so as to verify the local host through mutual authentication, to encrypt a security profile of the software mobility device, when the local host is verified, and to transmit the encrypted security profile to the local host so as to provide secure communication between the local host and the software mobility device.

7. The device of claim 6, wherein the software mobility device is contained in a mobile storage medium.

8. The device of claim 6, wherein:
the software mobility device is included in a server computer connected to the local host by a network; and
an operating system virtualization client is downloaded to the local host from the server computer for mediating communication between the operating system virtualization layer and the local host included in the server computer.

9. A software mobility device comprising an operating system virtualization layer, the device comprising:
a security management unit to identify whether an application is a subject of an application for security policy that requires secure I/O while executing the application in the software mobility device, to install a security filter driver to a kernel mode on the local host, if the application is the subject of application for security policy, as the result of identification, and to form a secure channel using a session key while transmitting data for executing an I/O device according to execution of the application included in the software mobility device by the software mobility device and the security filter driver so as to transmit data.

10. The device of claim 9, wherein:
the session key is generated through mutual authentication between the software mobility device and the security filter driver while installing the security filter driver of the software mobility device; or the session key is owned in common between the software mobility device and the security filter driver before installing the security filter driver of the software mobility device so as to be included in the security filter driver.

11. A software mobility device comprising:
a top layer unit to provide application services to a user; and
an OS virtualization layer unit to provide a virtualization layer between the top layer unit and a local host, the OS virtualization unit comprising a virtualization management unit to manage virtualization of the local host, a resource management unit to manage resources of the local host, and a security management unit to manage security with the local host;
wherein the security management unit performs mutual authentication with the local host to authenticate the local host so as to provide secure communications between the local host and the software mobility device, and the mutual authentication comprises receiving an integrity value measured in the local host, comparing the measured integrity value with an integrity value included in a certificate received from the local host, so as to verify the local host and providing secure communication between the local host and the software mobility device.

12. The software mobility device of claim 11, wherein the security management unit exchanges certificates and integrity values with the local host, authenticates the local host by comparing an integrity value received from the local host with an integrity value contained in a certificate received from the local host, generates and encrypts a security profile using a session key if the local host is authenticated, so as to provide secure communications between the local host and the software mobility device.

13. The software mobility device of claim 12, wherein the security management unit further comprises a virtualization trusted computing database (vTCB) to store the integrity values contained in the certificates.

14. The software mobility device of claim 11, wherein, if the security management unit determines whether the application requires a secure channel, the security management unit installs a security filter driver in the local host, and forms a secure channel for the application using a session key.

15. The software mobility device of claim 11, wherein the software mobility device is downloaded from a server to the local host.

16. The software mobility device of claim 11, wherein the software mobility device is stored in a mobile storage medium.

17. The software mobility device of claim 11, wherein the local host comprises a security monitor to determine whether a user of the software mobility device has permission to access an object in the local host or to perform an action, and to selectively allow the access or action depending on the result of the determination.

18. The software mobility device of claim 11, wherein the software mobility device is provided without separately installing the software mobility device on the local host.

* * * * *